M. HOCHSTADTER.
ELECTRICAL CONDUCTOR.
APPLICATION FILED JAN. 16, 1915.

1,211,153.

Patented Jan. 2, 1917.

Witnesses
Ida O. Krumyn
Madelin L. Hirsch

Inventor
Martin Hochstadter
by Briesen & Knauth
Att's

UNITED STATES PATENT OFFICE.

MARTIN HOCHSTADTER, OF BERLIN, GERMANY.

ELECTRICAL CONDUCTOR.

1,211,153. Specification of Letters Patent. Patented Jan. 2, 1917.

Application filed January 16, 1915. Serial No. 2,755.

*To all whom it may concern:*

Be it known that I, MARTIN HOCHSTADTER, a citizen of the German Empire, residing at Berlin, Germany, have invented certain new and useful Improvements in Electrical Conductors, of which the following is a specification.

My invention relates to improvements in electrical conductors for overhead transmission lines and for underground cables.

The object of my invention is to devise a stranded conductor for electric mains, which conductor comprises the main conductor (designed to carry the useful current) and one or more embedded special conductors, insulated from the main conductor and specifically adapted to serve extra purposes besides the transmission of power, for instance for testing safety-, disconnecting-, telephone-, signaling- or automatic controlling means in coöperation with the respective mains.

A further advantage of my invention is to provide means for protecting the insulation of the insulated wires against injurious or destructive influences arising during the manufacture, the laying out and the operation of such mains.

The individually insulated wire is hereinafter called "control wire."

It has already been known in the art to arrange testing wires within the outer metallic sheathing of underground cables. But it has not been disclosed how to combine with the overhead mains individual wires for any controlling purposes and to be used in coöperation with the power transmission of the mains. As yet such wires, have rather been mechanically and electrically separated from the main conductors and laid out on particular poles and insulators. Evidently the latter construction is particularly disadvantageous just for overhead mains as compared with underground cables. When long spans are used in the construction of the main line, frequently a separate system of poles will be required for the control wires in order to avoid uneconomically thick wires and costly material (for instance bronze).

Besides the economical disadvantages the separate layout of overhead control wires involves the risk that they will, more than the mains themselves, tend to interruptions and faults on account of the influence of neighboring high tension lines and of atmospherical disturbances. This, of course, badly interferes with the intended purpose of those wires especially during disturbances in the operation of the mains and such methods therefore exclude every automatical control system for the sections of extended distributing nets from practical use because such system and the respective apparatus would act upon faults of the control wires more frequently than upon faults of the mains, which means to bring about quite an increased number of disconnections and additional disturbances.

The above mentioned difficulties are overcome by my invention according to which the control wires are not only closely attached to but also embedded into the metal strand of the main conductor. This construction affords the benefits of saving all extra expense for a special installation of the control wires and of endowing the control wires without extra expense with at least the same or rather a higher degree of operating safety than the mains themselves. This is achieved because of this new construction of combined conductors allows to operate the control wires in metallic connection with the mains and about or fully with their respective potential thus, at the same time, allowing the control wires to participate in the transmission of power and also avoiding incidental and uncertain potentials in the control wires which are influenced in separately laid-out wires by adjacent power mains. Moreover by adequate construction in carrying out this invention the embedded control wires of a suspended main may be freed from mechanical tension by utilizing the respective main as a mechanical bearer.

Of course the insulation of the control wires in overhead mains will be preferably composed of a water-and weather-proof material. Most advantageously for the same purpose the insulated control wires, according to my invention, may be entirely inclosed in a seamless metallic protective sheathing, the latter preferably to be of the same material as the strand itself, this being mostly of copper. The protecting sheathing may also participate in the conduction of useful current for power transmission, for instance by being connected to or being in contact with the main strand. It has to be specifically stated that this seamless or at least water-tight metallic cover around the insulated control wire, besides the above cited benefit for overhead use, offers the following important and additional advantages when such conductors are used as conductor cores in the manufacture of underground cables. In this case the metallic cover already during manufacture of the strands and cables avoids mechanical injury of the insulation of the control wires and allows to employ a mantled control wire which has individually and definitely been tested beforehand. Furthermore the insulation material may be of a manyfold nature because during the following compounding process the hot and fluid compound has no access to the insulation and therefore cannot chemically attack it. Further benefits are offered by this metallic cover during operation of mains manufactured according to my invention. The metallic cover around the control wire prevents the surrounding wires of the strand from being pressed into the insulation and, particularly when being in contact or in connection with the main strand, secures an equal distribution of the electric field around the control wire, both of these influences of the cover allowing a very thin insulation to be employed.

While preferred forms of conductors embodying my invention are illustrated upon the accompanying sheet of drawing, yet it is to be understood that minor detail changes may be made without departing from the scope thereof.

Figure 1:
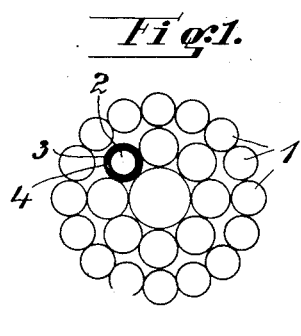
Figure 1 represents a conductor according to my invention which consists of the main conductor (1), for instance a copper strand formed of a bundle of uninsulated wires and adapted to carry heavy currents, a control wire (2), which in this case is shown located in the superficial part of the main strand and insulated therefrom by the insulation (3) and covered by a copper mantle 4.
Figure 2:
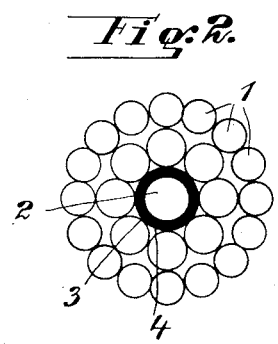
Fig. 2 shows another form of carrying out my invention. In this case the control wire (2) is located in the center of the main copper strand (1), insulated therefrom by a body of insulation (3) and finally covered by a copper mantle (4) to be applied on the surface of the insulation (3).
Figure 3:
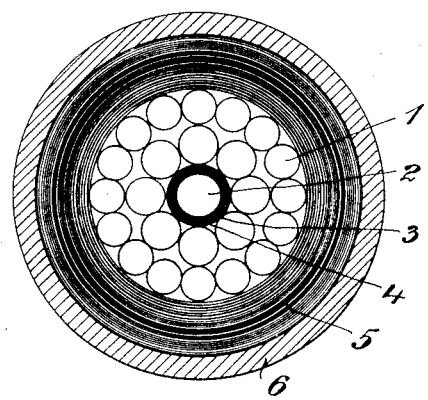
Fig. 3 shows the same form of stranded electrical conductor as described in Fig. 2 when employed as conductor in an underground cable. (5) is the insulation and (6) the lead sheathing of the cable.

As may be concluded from above statements, conductors according to my invention are particularly adaptable for such purposes which include the use of control wires under nearly or fully the same electrical working pressure as the respective mains, for instance in case of safety-, disconecting-, signaling and automatic control systems for the operation of the mains.

I claim:

1. An aerial conductor for overhead power transmission consisting of a bundle of bare copper strands in conductive contact to constitute a main conductor, said bundle being devoid of insulation, and an auxiliary conductor, which alone is provided with an insulation, said insulation separating said auxiliary conductor from the main conductor, the insulated auxiliary conductor being embedded in the uninsulated main conductor.

2. An aerial conductor for overhead power transmission consisting of a bundle of uninsulated copper strands in conductive contact to constitute a main conductor, an insulated auxiliary conductor embedded in the main conductor, and a metallic protective covering surrounding the auxiliary conductor.

3. An aerial conductor for overhead power transmission consisting of a bundle of uninsulated copper strands in conductive contact to constitute a main conductor, an insulated auxiliary conductor embedded in the main conductor, and a metallic covering surrounding the auxiliary conductor and adapted to participate in the carrying of the current of the main conductor.

MARTIN HOCHSTADTER.

Witnesses:
HENRY HASPER,
WOLDEMAR HAUPT.